No. 779,945. PATENTED JAN. 10, 1905.
M. E. LEHMANN.
COTTON PICKER.
APPLICATION FILED FEB. 17, 1904.
2 SHEETS—SHEET 1.
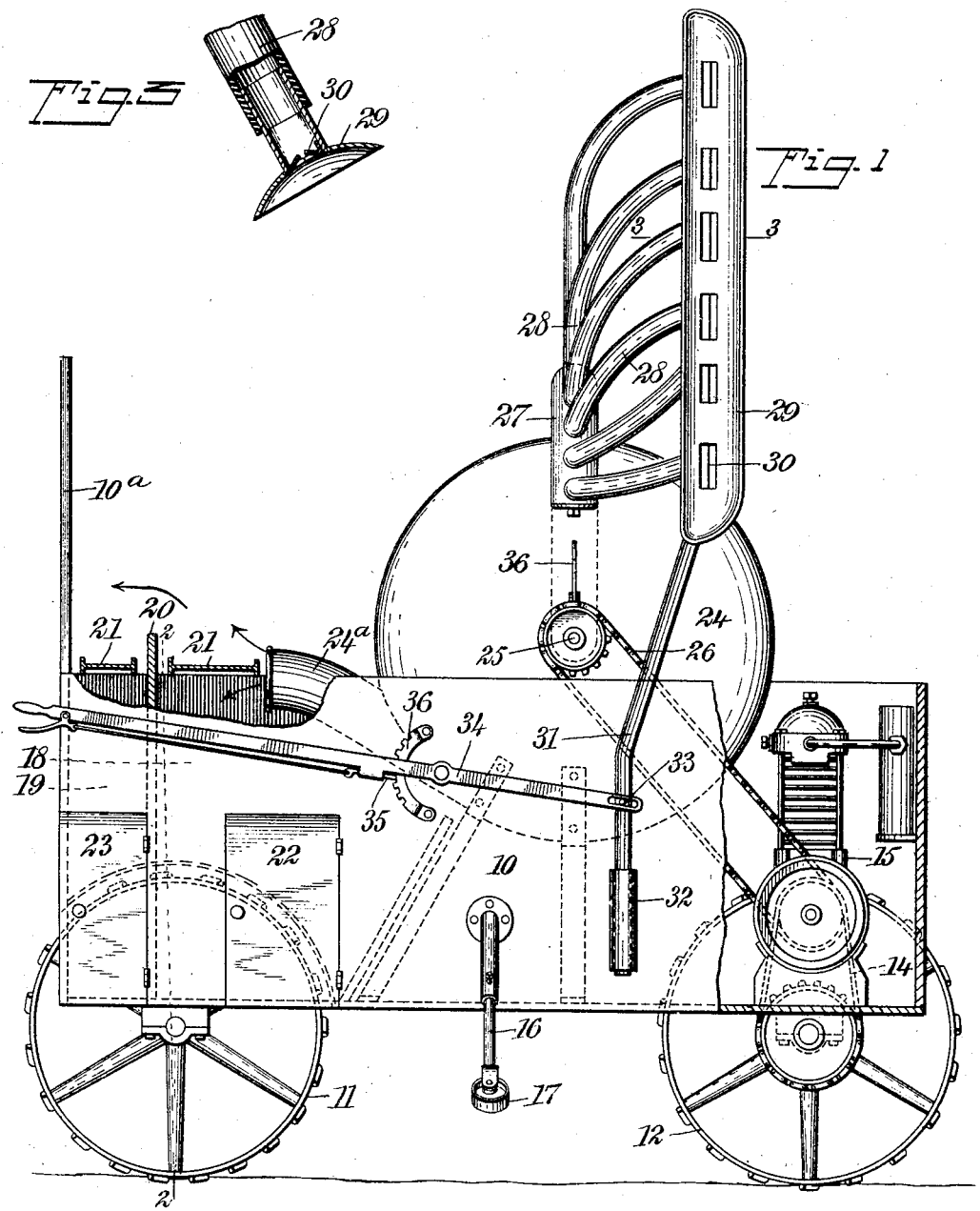
WITNESSES:
INVENTOR
Max E. Lehmann
BY
ATTORNEYS

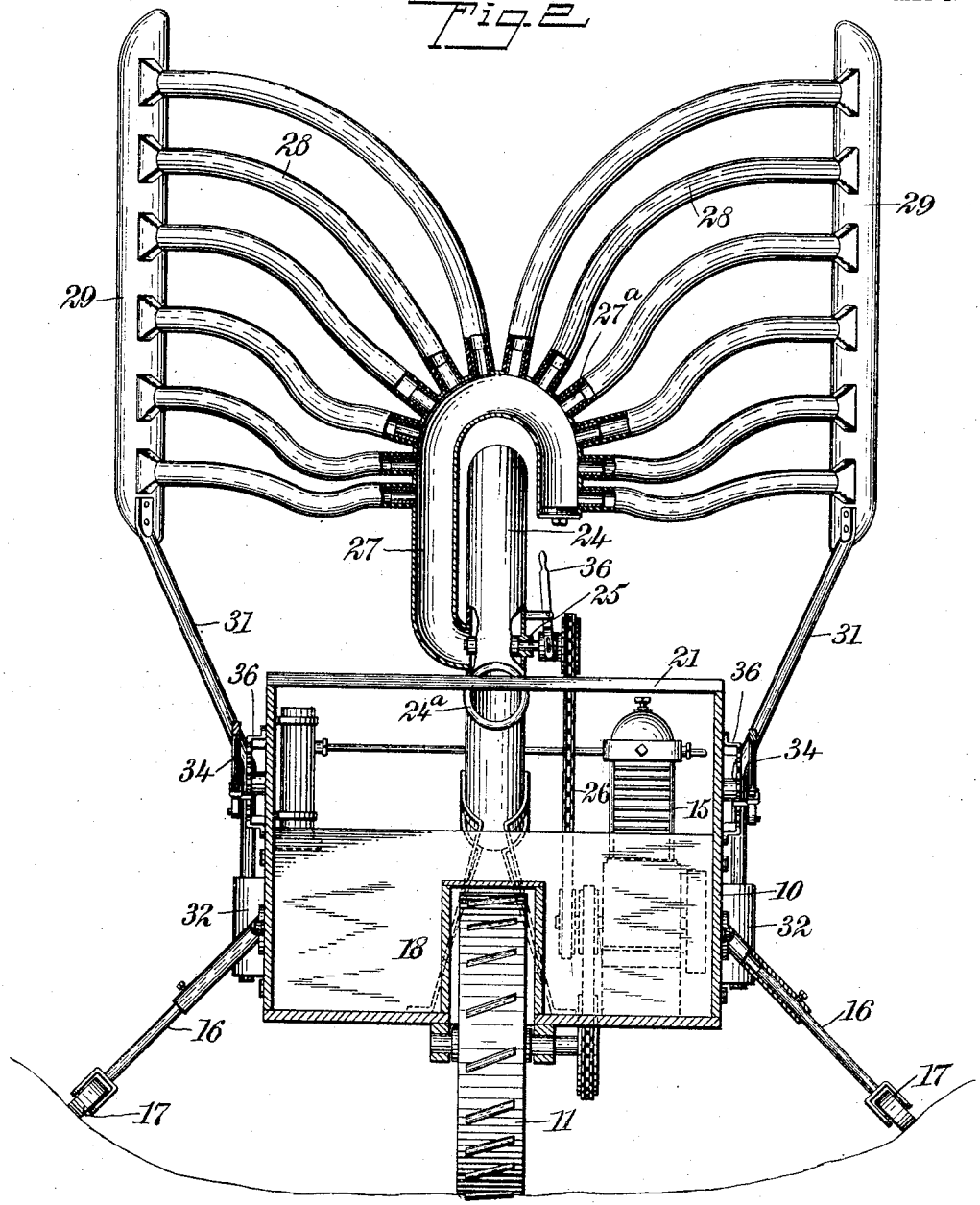

No. 779,945.

Patented January 10, 1905.

UNITED STATES PATENT OFFICE.

MAX E. LEHMANN, OF BATON ROUGE, LOUISIANA.

COTTON-PICKER.

SPECIFICATION forming part of Letters Patent No. 779,945, dated January 10, 1905.

Application filed February 17, 1904. Serial No. 193,952.

*To all whom it may concern:*

Be it known that I, MAX E. LEHMANN, a citizen of the United States, and a resident of Baton Rouge, in the parish of East Baton Rouge and State of Louisiana, have invented a new and Improved Cotton-Picker, of which the following is a full, clear, and exact description.

This invention relates to a pneumatic cotton-picker; and it comprises certain novel devices for drawing the cotton from the plants and for automatically separating the cotton from the dead leaves and other foreign matter removed from the plants with the cotton.

The invention involves various other features of major or minor importance, and all will be fully set forth hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a side elevation of the invention with parts broken away. Fig. 2 is a sectional elevation of the invention on the line 2 2 of Fig. 1, and Fig. 3 is a detail section on the line 3 3 of Fig. 1.

The apparatus comprises a vehicle-body 10, which may be of any desired form and which is mounted on wheels 11 and 12, arranged in the longitudinal center of the body and one of which wheels is connected by a chain 14 with an engine 15 of any suitable form mounted on the body 10, whereby to drive said wheel and propel the vehicle.

16 indicates adjustable arms fastened to the sides of the body 10 and carrying casters 17 at their lower ends adapted to run on the sides of the mound on which the plants are grown, so as to support the apparatus in an upright position.

The body 10 is formed with a cotton-compartment 18, forward of which is a compartment 19 for the leaves and trash, these compartments being separated by a vertical wall 20, at each side of which lies a horizontal wall 21. Said walls are separated from the wall 20, and the front wall 21, lying over the leaf-compartment, is also separated from the front wall 10ª of the body 10, which wall extends up considerably above the sides of the body in the form of a dashboard, as indicated in Fig. 1. The said compartments 18 and 19 are fitted with doors 22 and 23, through which their contents may be readily removed.

Suitably mounted on the body 10 is a blower-casing 24, having a shaft 25 revolubly mounted in the center thereof, said shaft carrying blower-blades (not shown) which may be of any desired form. The shaft 25 is connected by a chain 26 with the before-described motor 15, so that said motor serves not only to propel the apparatus, but to drive the blower. The blower-casing 24 has its discharge-spout 24ª projected forwardly and opening just rearward of the rear horizontal wall 21. The cotton-leaves are drawn into the blower-casing and discharged therefrom by the spout 24ª. The cotton, being the heaviest of all the material thus discharged, will fall immediately into the cotton-compartment 18, or at best small portions of the cotton will pass over the partition 21 and strike the wall 20, whereupon they will fall into the compartment 18 between the wall 20 and the rear partition 21. The leaves and other light material will, however, pass upward clear of the wall 20 and fall into the compartment 19, the front wall 10ª of the body 10 acting to prevent further forward movement of the leaves. In this manner the cotton and leaves will be automatically separated from each other.

27 indicates an intake-pipe leading from the center of the casing 24 and having a number of connections 27ª respectively joined to rubber or other flexible tubes 28. Said tubes 28 are divided into two groups, which pass, respectively, to the sides of the apparatus and communicate with suction-heads 29, which extend vertically at each side of the machine, as shown. Said heads are provided with inwardly-opening resilient shutters 30, which open as the suction is created in the tubes 28 and which close when said suction ceases. These shutters act to prevent the return of the cotton after having been once drawn through the blower-head. The blower-heads are rigidly sustained in the desired position and may be adjusted vertically by means of arms 31, attached to the lower portions of the blower-heads and arranged to slide freely in vertically-disposed boxes 32, mounted at each side of the body 10. Said arms 31 have slot-and-pin connections 33 with hand-levers 34, fulcrumed, respectively, on the sides of the body 10 and having hand-pawls 35 coacting with quadrants 36, secured to the body 10 of the apparatus. By adjusting these levers 34 the blower-heads may be raised or lowered into any desired position to suit the height of the cotton-plants and the other conditions under which the apparatus may be operating.

In the practical employment of the apparatus the blower-heads are suitably adjusted and the apparatus is driven by its engine 15 or by other means, if desired, between the rows of plants, so that the suction created at the suction-heads 29 will draw the cotton from the plants and force the same through the tubes 28, intake-tube 27, and case 24, causing the cotton to be discharged at the front portion of the machine and automatically separated from the leaves and trash, as before explained.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. In a cotton-picker, the combination of a body, pneumatic cotton-picking devices including a discharge-spout, a vertically-extending wall or partition mounted in the body to form two compartments, and a horizontal wall located over each compartment respectively at the sides of the said vertical wall or partition, the said compartments having passages at the side edges of said horizontal walls, the said discharge-spout opening adjacent to and opposite one of the side edges of one of said horizontal walls.

2. In a cotton-picker, the combination of a body, a vertically-extending orificed suction-head, means for mounting the same on the body, a plurality of tubes communicating with the orifices in the suction-head, an intake-pipe to which said tubes lead, and means for creating a suction in said intake-pipe.

3. In a cotton-picker, the combination of a body, a vertically-extending orificed suction-head, means for adjustably mounting same on the body, a plurality of tubes communicating respectively with the orifices of the suction-head, an intake-pipe communicating with the tubes, and means for creating a suction in the intake-pipe.

4. In a cotton-picker, the combination of a body, a vertically-extending orificed suction-head, means for adjustably mounting same on the body, a plurality of tubes communicating respectively with the orifices of the suction-head, an intake-pipe communicating with the tubes, and means for creating a suction in the intake-pipe, said means for adjusting the suction-head comprising an arm attached to the suction-head, a box attached to the body and having the arm slidable therein, and a lever having connection with the arm.

5. In a cotton-picker, the combination of a body, cotton-picking means mounted thereon, two carrying-wheels sustaining the body and located at the ends of the body and approximately in the longitudinal center thereof, and steadying devices at each side of the body approximately midway between its ends, said devices projecting outward and downward from the body and being adapted to engage the row-hills at each side of the machine.

6. In a cotton-picker, the combination of a body, cotton-picking means mounted thereon, two carrying-wheels sustaining the body and located near each end of the body and approximately in the longitudinal center thereof, and steadying devices at each side of the body approximately midway between the ends thereof, said devices projecting outward and downward from the body and being adapted to engage the row-hills at each side of the machine, said steadying devices comprising adjustable arms attached to the body and wheels carried at the outer ends thereof.

In testimony whereof I have signed my name to this specification in the presence of two subscribing witnesses.

MAX E. LEHMANN.

Witnesses:
A. W. HERNANDEZ,
F. A. WOODS.